Figure 1:
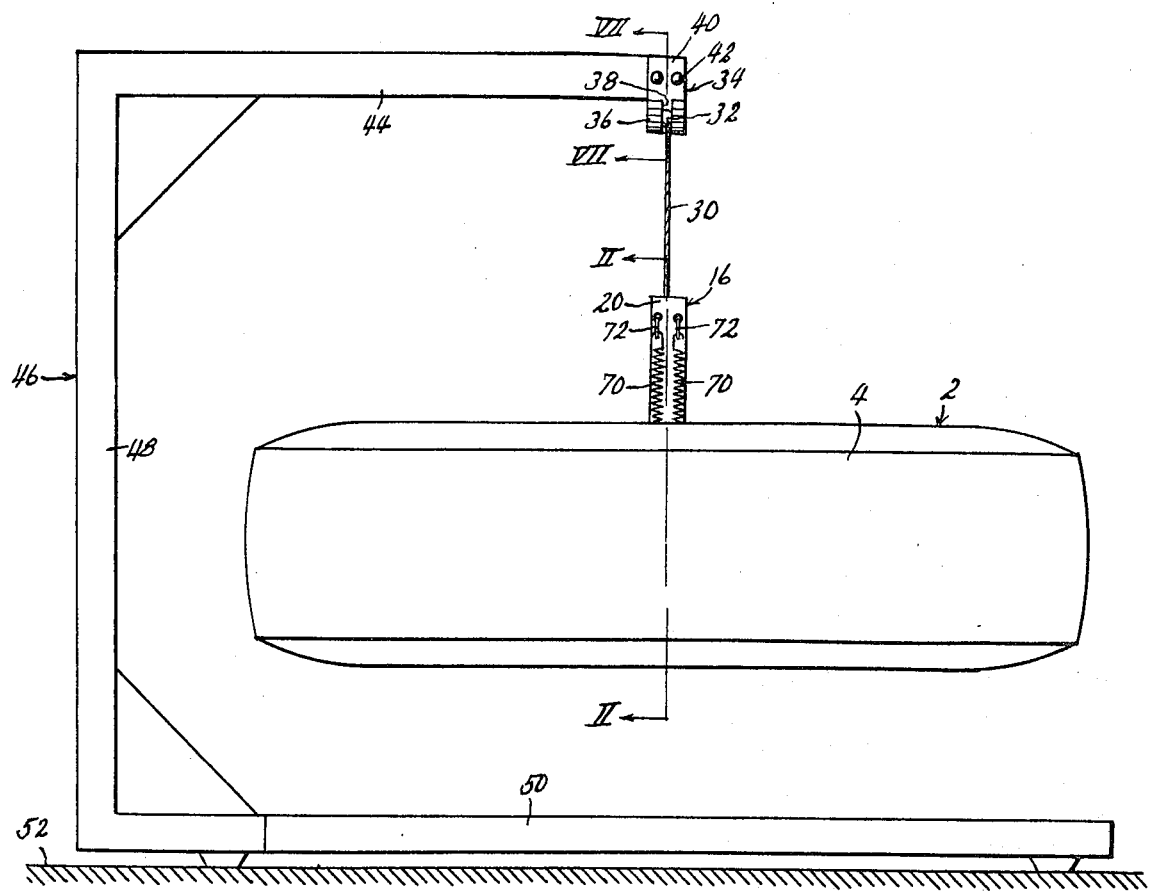

United States Patent [19]

Kubik

[11] 4,011,762

[45] Mar. 15, 1977

[54] WHEEL BALANCING APPARATUS

[76] Inventor: Richard S. Kubik, 1030 Villa Vista Drive, Colby, Kans. 67701

[22] Filed: Dec. 8, 1975

[21] Appl. No.: 638,664

[52] U.S. Cl. .................................. 73/484; 73/486
[51] Int. Cl.² .................... G01M 1/02; G01M 1/12
[58] Field of Search ..................... 73/483, 484, 486

[56] References Cited

UNITED STATES PATENTS

| 2,478,477 | 8/1949 | Graves | 73/486 |
| 2,481,256 | 9/1949 | Sutton | 73/486 |
| 2,567,597 | 9/1951 | Currier | 73/484 |
| 2,698,537 | 1/1955 | Taylor et al. | 73/486 |
| 3,045,497 | 7/1962 | Lackie | 73/486 |
| 3,452,605 | 7/1969 | Markley | 73/486 |

*Primary Examiner*—James J. Gill
*Attorney, Agent, or Firm*—John A. Hamilton

[57] ABSTRACT

An apparatus for balancing automotive wheels consisting of a horizontal support plate adapted to be disposed beneath the central wheel disc, a flexible cable affixed to the support plate to extend upwardly through the central hub aperture of the wheel disc, apparatus for centering the wheel accurately concentrically with the cable, and a gauge member fixed to the support plate and having an aperture spaced above and concentric with the attachment of the cable to the plate, the cable extending through the aperture and being suspended from a higher point to support the wheel, a balanced condition being indicated when the cable is centered in the aperture.

1 Claim, 7 Drawing Figures

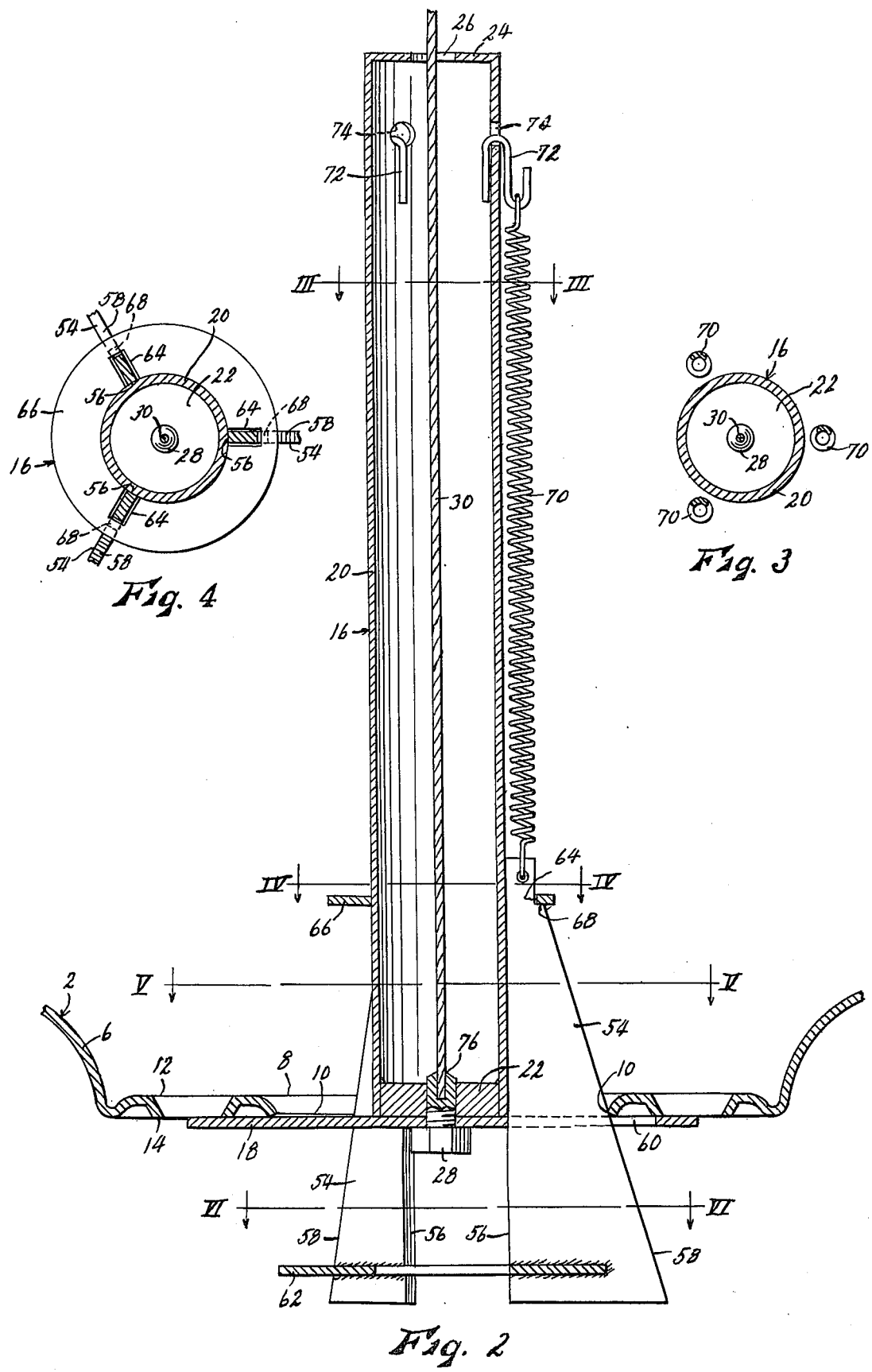

WHEEL BALANCING APPARATUS

This invention relates to new and useful improvements in wheel balancing apparatus such as is commonly used to indicate any out-of-balance condition of an automotive wheel, and to indicate points at which the common balancing weights should be applied to the wheel rims to bring it into balanced condition.

A primary object of the present invention is the provision of a wheel balancing apparatus wherein a wheel is supported by a flexible cable accurately concentric therewith, the cable extending through an aperture accurately concentric with and fixed relative to the wheel, but spaced thereabove. Any out-of-balance condition of the wheel will be indicated by an off-center positioning of the cable in the aperture, and can be corrected, thereby centering the cable in the aperture, by adding a balancing weight of the proper mass to the proper point of the periphery of the wheel rim.

Another object is the provision of a wheel balancing device of the character described including means for adjusting it to any desired degree of sensitivity.

A further object is the provision of a wheel balancing device of the character described including automatic means operable to center the wheel accurately relative to the suspending cable, regardless of variations over a wide range of the diameter of the hub aperture of its central disc.

Other objects are simplicity and economy of construction, involving no complicated, delicate or fragile parts such as liquid bubble devices, and efficiency and dependability of operation.

Figure 5:
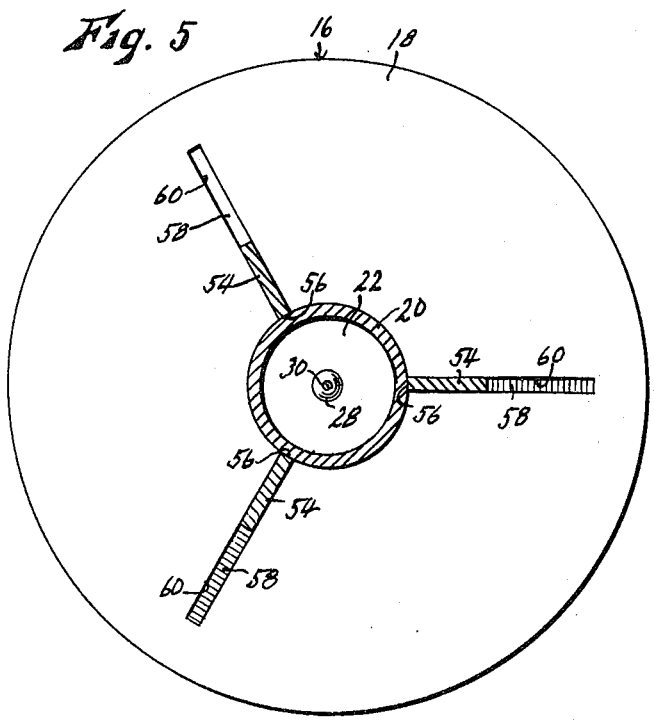
Figure 6:
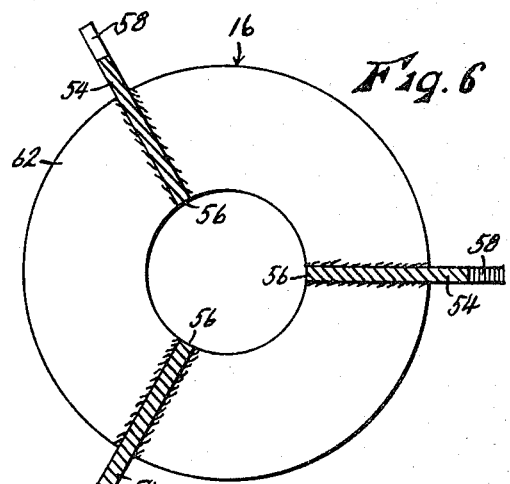
Figure 7:
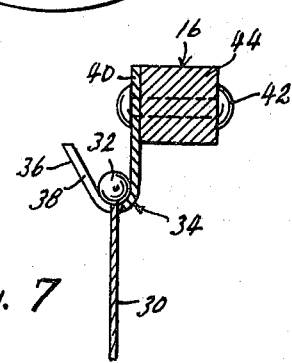

With these objects in view, as well as other objects which will appear in the course of the specification, reference will be had to the accompanying drawing, wherein:

FIG. 1 is a side elevational view of a wheel balancing apparatus embodying the present invention, with an automotive wheel mounted in operative relationship thereto, FIG. 2 is an enlarged, fragmentary sectional view taken on line II—II of FIG. 1, FIG. 3 is a sectional view taken on line III—III of FIG. 2, FIG. 4 is a fragmentary sectional view taken on line IV—IV of FIG. 2, FIG. 5 is a sectional view taken on line V—V of FIG. 2, with the wheel omitted, FIG. 6 is a sectional view taken on line VI—VI of FIG. 2, and FIG. 7 is an enlarged, fragmentary sectional view taken on line VII—VII of FIG. 1.

Like reference numerals apply to similar parts throughout the several views, and the numeral 2 applies generally to an automotive wheel of an ordinary type, including a tire 4, and a rim including a central disc 6 (see FIG. 2) having a central portion 8 which has a circular central hub aperture 10 formed therein, the plane of said aperture being parallel to the general plane of the wheel and accurately concentric with said wheel. Disc 6 is usually not planar, being configurated as desired, usually for decorative or style considerations, but is generally of uniform radial cross-sectional contour throughout its periphery. Central portion 8 of the disc is also usually not actually planar, but has elements thereof defining, in skeleton form, planar surfaces 12 and 14 capable of resting solidly on any planar surface of larger diameter than its central aperture 10. The object of the balancing operation is of course to equalize the wheel weight uniformly and symmetrically about the axis of aperture 10, which represents its axis of rotation in normal usage.

The balancing apparatus forming the subject matter of the present invention is indicated generally by the numeral 16, and includes a planar wheel supporting plate 18 having the form of a circular disc of larger diameter than the diameter of aperture 10 of any wheel in connection with which the device is adapted to be used. The diameters of these orifices are not standardized or equal in all wheels. In use, wheel 2 is placed in a horizontal plane, as shown in FIG. 1, and plate 18 is placed below central portion 8 of wheel disc 6, as shown in FIG. 2, overlying aperture 10, so that one or the other of surfaces 12 or 14 of the wheel disc lies flat on the plate. Surfaces 12 and 14 of the wheel disc are accurately parallel to the general plane of the wheel and normal to its axis of rotation.

A straight, hollow cylindrical tube 20 is affixed centrally to plate 18 and projects upwardly therefrom, accurately at right angles to and coaxial with said plate, being affixed thereto by a cylindrical plug 22 inserted in its lower end, which is welded or otherwise affixed both to the tube and to plate 18. Said tube may be of any desired length, and its upper end has fitted therein a disc 24 in which a circular hole 26 is formed, said hole being accurately concentric with the tube.

A bolt stud 28 is threaded upwardly through support plate 18 and plug 22 to extend into the hollow interior of tube 20. Said stud is also accurately coaxial with the tube. The lower end of a very thin and flexible cable 30 is affixed coaxially in the upper end of said stud. Said cable may be formed of stranded steel or other suitable material, and may be fixed in said stub by welding, sweating, or other suitable process. It must of course be of sufficient tensile strength to support the entire weight of wheel 2. The cable extends upwardly through tube 20 and through hole 26 of disc 24, and has a spherical ball 32 affixed to its upper end in spaced relation above the upper end of the tube. Ball 32 is releasably supported in a V-shaped bracket 34, one leg 36 of which has a slot 38 formed therein wide enough to admit cable 30 but not to pass ball 32, and the other leg 40 of which is affixed, as by rivets 42, to one end of a horizontal arm 44 of a stand 46, said stand including a vertical standard 48 affixed to the opposite end of arm 44, and in turn affixed to a stable base 50 supportable on a floor 52.

Three centering blades 54 are spaced regularly about the periphery of the lower portion of tube 20. Said blades are planar, each being generally triangular, and disposed radially to the tube, each blade having its inner edge 56 disposed vertically and slidably against the outer surface of tube 20, and its outer edge 58 sloping outwardly and downwardly at an acute angle. Said blades project downwardly below support plate 18, each blade being disposed snugly but slidably in a slot 60 formed radially in said support plate. Beneath the support plate, all three blades are welded or otherwise rigidly affixed to an annular washer 62 the plane of which is parallel to plate 18. The upper ends of said blades project through notches 64 formed internally in an annular retainer washer 66. Said washer encircles tube 20, is vertically slidable thereon, and rests on upwardly facing shoulders 68 formed on the outer edges of the blades. A tension spring 70 is hooked at its lower end to each of blades 54, above retainer washer 66, and extends upwardly externally of tube 20. The engagement of the springs in the blades secures the blades and retainer washer in assembly.

The upper end of each spring 70 is hooked to an S-hook 72, said S-hook being engaged in an aperture 74 formed in tube 20 adjacent its upper end. Blades 54 and springs 70 constitute an automatic centering device, as will appear.

In operation, ball 32 of cable 30 is detached from bracket 34, and said cable is lead upwardly through the central hub aperture 10 of disc 6 of the wheel 2 to be balanced. Tube 20 is also extended through said aperture, until either surface 12 or surface 14 of the central portion 8 of the disc rests on support disc 18, as shown in FIG. 2. When the wheel is not on the disc, springs 70 elevate blades 54 slidably on tube 20 either until outer edges 58 of blades 54 abut the outer ends of slots 60, or until washer 62 abuts the lower surface of disc 18. In this position, blade edges 58 must define a circle at the upper surface of plate 18 which is of larger diameter than the largest central aperture 10 of any wheel with which the device is adapted to be used. Therefore, as central portion 8 of the wheel disc approaches plate 18, the periphery of aperture 10 thereof engages the outer edges 58 of blades 54 and forces said blades downwardly against the tension of springs 70. So long as care is taken that all of blades 54 contact disc 6 at the periphery of aperture 10, the force of springs 70 tending to elevate the blades will cause blade edges 58 to cam wheel 2 into a position accurately concentric with plate 18, and will maintain this position when the wheel disc is resting on plate 18. Of course, the weight of wheel 2 is amply sufficient to overcome the tension of springs 70. Ball 32 of cable 30 is then re-engaged in bracket 34 so that said cable suspends wheel 2 in a generally horizontal plane, out of contact with any other support, as shown in FIG. 1. If the wheel is not in a properly balanced condition, it will not come to rest in a horizontal plane, but with its axis tilted in one direction or another from vertical. This tilting will be indicated by an off-center position of cable 30 within the central hole 26 of disc 24 at the top end of tube 20.

To balance the wheel, one or more of the usual lead balancing weights (not shown) are laid on the then top surface of the wheel, at the juncture of the tire and the wheel rim, generally at the point of the periphery thereof toward which cable 30 is observed to be offset in hole 26 of disc 24. When weights of the proper weight have been selected and properly placed the wheel is balanced, as will be indicated by the centering of cable 30 in hole 26, and the weight or weights may be affixed to the wheel rim, all as well understood in the art.

To understand the operation of the device more fully, it should be appreciated that with the present device wheel 2 is actually supported by a pendulum. Cable 30 is not the pendulum. Instead, the pendulum is rigid and best characterized as formed by threaded stud 28, the length of the pendulum being defined as the vertical distance between the upper end 76 of said stud, which is the point at which cable 30 flexes when the wheel tilts, and the vertical center of gravity of the mass of the wheel. Thus, assuming that the vertical center of gravity of the wheel is at surface 14 of its central disc, which rests on plate 18 as shown, and which by no means is uniformly true in all wheels, the pendulum length is equal to the extension of said stud above plate 18. Point 76 must be above the vertical center of gravity of the wheel in order that the wheel will tend to come to rest in a horizontal plane as shown when balanced. It will be readily apparent that if a wheel were perfectly balanced in all planes about a center of gravity, and was suspended from a flexible support at that point, it would not come to a horizontal plane as shown of its own weight, but would simply remain at whatever angle of tilt it might be placed. Of course, if wheel 2 does tilt in the present device, due to an imbalance of the wheel, cable 30 also tilts, in the opposite direction, in order to bring the actual center of gravity of the wheel vertically beneath the point of suspension of the upper end of the cable, although the tilt of the cable from vertical will be much less than the tilt of "pendulum" stud 28 due to the wide inequalities of their lengths. Of course, any tilting of stud 28 causes an equal tilting of tube 30, which will be readily observed by an off-center relation of cable 30 in hole 26.

However, while the use of a "pendulum" of positive length, with upper end 76 thereof above the vertical center of gravity of wheel 2, is necessary to the operation of the present device, it will be apparent also that within limits of practicality, the sensitivity of the device may be increased by making said pendulum shorter. The primary requirement that point 76 be above the center of gravity of the wheel may be satisfied very simply by inserting a stud 28 of sufficient upward extension that the wheel tends to swing to at least a generally horizontal plane when suspended from the cable. Thereafter, the stud may be threaded downwardly, thereby shortening the pendulum until the least amount of imbalance of the wheel considered to be significant will still produce a degree of tilting of the wheel which can be easily detected and read. Obviously, the shorter the pendulum, the greater will be the degree of tilt produced by a given degree of imbalance. Thus, threading stud 28 upwardly or downwardly relative to plate 18 provides a means for respectively decreasing or increasing the sensitivity of the device.

Certain other structural features of the device also provide easy selection of different degrees of sensitivity. For example, it will be apparent that the smaller hole 26 may be, this hole together with cable 30 providing the readable "gauge" of the device, the smaller any off-center position of the cable therein which may be readily observed. Also, the longer tube 20 may be, the greater the displacement of hole 26 relative to the cable will be in response to a given degree of tilt of plate 18. However, the proportions shown provide a degree of sensitivity well within reasonable and practical requirements. Automotive wheels are seldom balanced with absolute perfection, and it would serve little useful purpose to do so, since such perfection would in any event soon be cancelled by imperfect mounting of the wheel on the vehicle, by tire wear, or by other causes.

A simpler and perhaps less expensive means for centering the wheel on plate 18 could be utilized if desired. For example, a graduated series of annular discs could be used, each disc having a central aperture size to engage slidably over tube 20 to rest on plate 18, and having sufficient thickness to project upwardly through wheel apecture 10. The outer diameters of said discs could be graduated to permit selection of one disc having the proper external diameter to fit snugly but slidably in the central apecture 10 of any given wheel disc. The automatic centering device including blades 54 and springs 70 is preferred, however, in view of its universal applicability to virtually any wheel.

While I have shown and described a specific embodiment of my invention, it will be readily apparent that many minor changes of structure and operation could be made without departing from the spirit of the invention.

What I claim as new and desire to protect by Letters Patent is:

1. In a wheel balancing device for automotive wheels:
   a. a planar support plate adapted to be placed beneath the central disc of a wheel in overlying relation to the central hub aperture of said wheel to support said wheel in a generally horizontal plane,
   b. a rigid tube affixed at its lower end to said support plate concentrically therewith and extending upwardly therefrom accurately at right angles to the plane thereof,
   c. a generally vertical flexible cable,
   d. attaching means connecting the lower end of said cable to said support plate such that the lowermost flexure joint of said cable is disposed at least slightly above the center of gravity of a wheel carried on said support plate, said cable extending upwardly through and above said tube,
   e. centering means operable to center said wheel concentrically with said tube and the lower end of said cable, said centering means comprising an upwardly tapering, generally conical assembly carried by said support plate and consisting of a plurality of planar blades disposed in planes radial to said tube and spaced regularly thereabout, said blades projecting slidably through notches formed radially in said support plate, whereby said assembly may be moved slidably in a direction parallel to said tube, the inner edges of said blades resting in sliding engagement with said tube, and the outer edges of said blades sloping downwardly and outwardly, connecting means rigidly joining said blades together beneath the level of said support plate, and resilient means biasing said conical assembly yieldably upwardly relative to said support plate, whereby to adjust the circle defined by the outer edges of said blades at the upper surface of said support plate to the diameter of the central hub aperture of said wheel, said resilient means biasing said conical assembly upwardly comprising a plurality of tension springs each connected at its lower end to the upper end of one of said blades, and at its upper end to said tube,
   f. a gauge member carried rigidly by said tube at the upper end thereof and having an aperture formed therein accurately concentric with said tube, said cable extending upwardly through said aperture, and
   g. means for suspending said cable from its upper end to support said wheel.

* * * * *